United States Patent [19]
Fulton

[11] Patent Number: 5,196,998
[45] Date of Patent: Mar. 23, 1993

[54] ADAPTIVE CONTROL MAN-AUGMENTATION SYSTEM FOR A SUSPENDED WORK STATION

[76] Inventor: Francis M. Fulton, 20090 S. Mountain Rd., Santa Paula, Calif. 93060

[21] Appl. No.: 503,379

[22] Filed: Apr. 2, 1990

[51] Int. Cl.$^5$ .................. B66F 11/04; G06F 15/46
[52] U.S. Cl. .................. 364/167.01; 182/2; 182/148
[58] Field of Search .............. 364/167.01, 478, 479; 414/273–275, 469, 486, 501, 505, 508; 56/328.1; 406/39; 182/2, 19, 148; 212/165

[56] References Cited

U.S. PATENT DOCUMENTS

| | | | |
|---|---|---|---|
| 3,667,190 | 6/1972 | Thornton-Trump | 414/508 |
| 3,878,957 | 4/1975 | Rempel | 56/328.1 |
| 4,514,796 | 4/1985 | Saulters et al. | 364/142 |
| 4,691,805 | 9/1987 | Kishi | 182/2 |
| 4,724,924 | 2/1988 | Breyer et al. | 182/2 |
| 4,910,662 | 3/1990 | Heiser et al. | 364/167.01 |
| 5,007,772 | 4/1991 | McKenna et al. | 56/328.1 |
| 5,088,020 | 2/1992 | Nishida et al. | 364/167.01 |
| 5,107,954 | 4/1992 | Fujimoto | 182/2 |

*Primary Examiner*—Jerry Smith
*Assistant Examiner*—Thomas E. Brown
*Attorney, Agent, or Firm*—David O'Reilly

[57] ABSTRACT

An adaptive control man-augmentation system controls the movement of a suspended work station. A support structure, usually mounted on a chassis, has with an extendable boom and a work station at the end of the boom. A directing member pivots in accordance with operator movements and the pivotal movement is resolved along two axes, normal to each other and having a fixed relationship within the boom. Resolving of operator movements provides signals for moving the boom so as to move the work station to any desired location, in response to operator movements. The position of the work station is monitored. The signals are continuously monitored and adapted with respect to situation variables to produce immediate and accurate movement response of the workstation to match operator requirements.

17 Claims, 4 Drawing Sheets

ADAPTIVE CONTROL MAN-AUGMENTATION SYSTEM FOR A SUSPENDED WORK STATION

This invention relates broadly to an adaptive control man-augmentation system for moving suspended work stations. Particularly, though not exclusively, the invention relates to the task coordinated controlled movement of platforms and similar such apparatus for workers. A typical example of such apparatus is the work platform which supports a fruit picker, where the invention provides for controlled movement and positioning of such platform continuously or intermittently as directed by the picker while he is simultaneously performing fruit location, detachment and disposal tasks. In some instances, the operator may not be positioned at the work station but on the ground. An example of such use is in pruning in which a remotely controlled articulated cutter can be mounted at the workstation, the operation of positioning the cutter and operating the cutter being carried out by an operator at some other position, for example, on the ground.

In its broadest aspects the present invention is useful in any situation in which it is desired to position a worker and/or other task effectors in various spatial locations to enable them to carry out task operations. Such operations include the fabrication or inspection and repair of mechanical structures, the application, restoration or removal of decorative embellishments, or the transportation placement and retrieval of equipment or materials, and other situations wherein three dimensional positioning of the worker and task effectors is necessary. For purposes of the present specification, a preferred embodiment of the invention will be described as utilized in a tree crop servicing apparatus.

Several structures, both mobile and stationary, have been proposed heretofore to elevate and position a worker adjacent to various tree branches in order to facilitate multi-positional tasks such as pruning, pollinating and harvesting tree crops. As an example, fruit pickers are supported on a platform, which may be in the form of a bucket, and the platform be suspended by means of a powered, articulated structure that can be moved to bring the picker into a picking position. It has also been previously proposed that an electrohydraulic control system be provided for actuating the various members of the support structure in response to the task related positioning of a picker's body and thereby to move the platform in a desired direction and at a desired rate. One such system is described in U.S. Pat. No. 3,384,201. In this example, the platform is mounted on a rectilinear arm configured to provide planer in-and-out movement. This arm is in turn mounted on a vertical lift-boom. Sideways movement of the platform is provided by rotation of the boom. The apparatus has control limitations that make it applicable only to vehicles with support structures that embody rectilinear movement in the vertical plane. The bucket platform's movements are controlled by direct actuation of various electrohydraulic controls using inputs generated by task related movements of the body of the person on the platform. This restricts the application and adaptability of the apparatus.

In order to optimize man-machine task efficiency in fruit picking and in other extended volume multi-positional tasks, it is essential that movements of the work station be the product of task related directive inputs by the worker utilizing the platform. Movements of the work station must be quick and accurate at all times and must be closely matched to the natural stimuli-decision-action capabilities of the human operator. Juxtaposed against these platform positioning performance requirements is the fact that the simpler and more efficient movable platform suspension structures are inherently non-linear in their directional and rate responses when driven by general purpose movement actuators. The picker's body actuated control inputs and the relatively complex rectilinear vertical plane platform movement features engineered into the system defined in U.S. Pat. No. 3,384,201 are one approach to meeting these mobile platform performance requirements.

In accomplishing the required level of work platform mobility and situational flexibility there is an even more important requirement. It is that the entire powered structure and its control system embody the highest achievable levels of intrinsic operational safety. The difficulties in achieving these fundamental objectives are compounded by the operational environment within which the man-machine system must be able to function. Tree crop service tasks are among the most demanding of these environments. Typically a picker must work continuously from the platform with his principal attention focused on the location, detachment and disposal of the tree crop. His tasks requires that he move around all of the leafline surface of each tree with periodic penetrations into the limb structure to collect interior fruits. When his platform mounted product container is filled he must rapidly move to bulk handling containers, avoiding all intervening tree and machine structure, and empty his collector container. He then must rapidly and safely retrace his path back to the current harvesting point.

When the tree crop located within the current work envelope of his machine is harvested, the operator must dock his work station on the machine and move the unit to its next harvesting position. The equipage must be capable of operating on tilled fields, ofttimes crisscrossed by furrows, berms or ditches. It may also be required to be capable of operating in untilled orchard areas, and hillside groves. To transit such terrain it must have a base carriage with excellent traction and low center-of-gravity when in the platform-docked configuration. To insure a full measure of stability under all terrain conditions where the mobile platform may be reasonably be expected to operate, the base platform of the assembly may be equipped with a self-leveling outrigger system. Tree crop groves and orchards are usually characterized by rows of trees planted to maximize per acre production. As these trees mature the clear space between the rows narrows, sometimes to the point where the upper limbs begin to intertwine. Even in these narrow and canopy cluttered corridors the machine and its mobile platform must be capable of operating safely and with high task efficiency.

With the foregoing requirements and considerations in mind, it is the primary object of the present invention to provide a greatly improved tri-dimensionally mobile work station apparatus; one that is capable of providing full augmentation to an operator's manifold task performance requirements in a dynamic work environment, and also equally able to simultaneously monitor and actively contribute to operational safety on a situational basis.

More particularly it is an object to provide an improved tri-dimensional mobile work station apparatus incorporating a multifunction adaptive control system capable of deriving spatial positioning directives by monitoring operator body positioning, to then condition the response to these directives in a process that takes into account apparatus situational variables and applies a full resident structure of operating criteria, and then to either generate the appropriate platform movement response or intervene in the execution of such directives when established safety or capability determinates would be violated.

The present invention can be applied to various forms of machine, with any powered articulated work station suspension system including rotatable telescopic boom machines, for a variety of purposes and with various modes of operation.

Broadly, there is provided means for the controllable movement of a work station comprising; sensing members for detecting the key directing movements of an activator or directing member as moved by an operator, means for resolving movement of the directing member relative to certain axes, means for producing signals related to such movement, means for actuating members of a support structure whereby the work station is moved to any desired location, and means for continuously monitoring positional and other operational factors. Means for continuously adapting control inputs to structural actuators in accordance with current situation variables produce immediate, accurate movement responses matched to the operators directives. Thus, the control system detects movement of a directing member relative to certain axes and produces outputs related to such movement to produce movement of a work station in the same or a situationally selectable relation to said axes.

Applied to a fruit picking apparatus and operated in a direct response mode, the directing member is connected to the picker's body and when horizontal movement is required, the picker leans in the desired direction of movement, resulting in matching directional movement of the platform at a rate proportional to his angle of lean. Vertical movement of the platform and picker are directed in an analogous manner by step-up step-down movements of either of the pickers legs. The directing member for the horizontal movements is flexibly connected to the remainder of the control system, allowing complete freedom of movement of the picker within the picking bucket.

The signals produced by the directing member are transferred to a microprocessor based central control processor which maintains continuous track of the platform support systems configuration and provides for the controlled movements of various members of a machine to provide the desired positioning in an efficient and safe manner.

In other operations the operator station may be located at some other position on the apparatus or even on the ground. In such instances the operator interface or directing member employed to direct the work platform or other task effector can be readily restructured to optimize the employment of the operator's natural task related body movements to direct the apparatus's task performance actions.

The flexibility of this type of control system is such as to permit ready tailoring of the interface to special needs or handicaps of individual operators.

In the particular example of a machine system configured for the application of the invention for fruit-picking and similar operations, there is provided a pedestal mounted for rotation about a vertical axis, a telescopic boom pivotally mounted at one end atop the pedestal for movement about a horizontal axis; a work platform pivotally mounted at the other end of the telescopic boom; means for independently rotating the pedestal, elevating the boom and extending and retracting the boom; and control means for actuation by a user for producing and controlling the movements of pedestal and boom whereby the platform is moved to a desired position. Means may also be provided for moving other elements: for example, for rotating and positioning the platform and/or task effectors relative to the boom. Means for moving this articulated work platform suspension structure into, thru-out and from the task environment may be provided in the form of a work terrain capable, powered carriage. Where appropriate this carriage can be fitted with an outrigger system that automatically expands the ground support base and levels the suspension structure before movement of the work platform from its docked position is permitted.

With the foregoing arrangement, there is provided a very simple, efficient and reliable engineering structure wherein the platform frame and thus the person and/or task effectors carried thereby may be spatially transited and positioned along any task defined tri-dimensional pathway quickly and without undue strain on the various parts.

The continuously adaptive control means, installed into the support structure and the operator interface, integrates a means for deriving platform movement directives from operator task related body movements with a programmable microprocessor; a multichannel means of continuously monitoring a network of compatible analog and/or digital physical state sensors, a multichannel means for supplying continuously variable analog voltage or current control outputs, and a compatible electrohydraulic and/or electromechanical means for proportionally actuating the elements of the platform support structure in accordance with the control outputs. Through this combination of structure and control the invention is able to quickly, accurately and reliably afford both directional and rate controlled responses to the operators tridimensional movement and positioning directives. The control processes incorporated into this invention are inherently capable of being programed to readily and continuously modify structural movement responses in accordance with situational variables, including selectable alternate modes of task processing.

The invention will be readily understood by the following description of certain embodiments, by way of example, in conjunction with the accompanying drawings in which.

FIGS. 6A, 6B, 6C, & 6D illustrate diagrammatically the relationship between an operator and the directing member and other controls.

Figure 7:
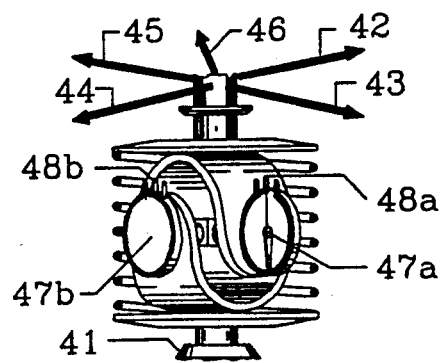

FIG. 7 illustrates a means for measuring and resolving operator body trunk lean attitude to derive platform movement directives.

Figure 8:
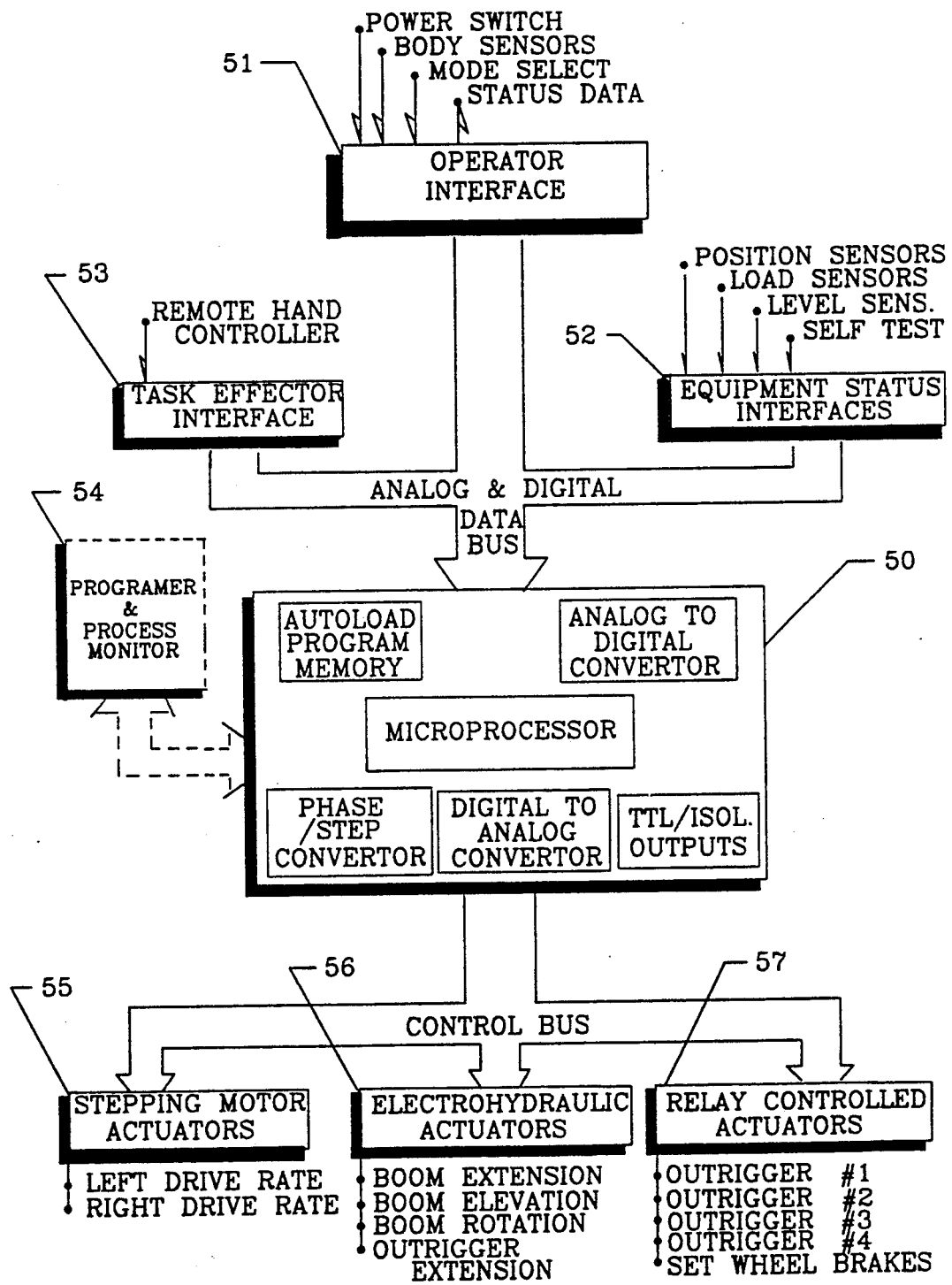

FIG. 8 illustrates diagrammatically a microprocessor with connections.

FIGS. 1 to 5 illustrate one embodiment of the invention in the form of a crop-picking apparatus comprised of a powered chassis (10), having an elongated pedestal (11) mounted at one end (12) on a central pillar (13). The pedestal (11) can pivot on the pillar about a vertical axis. At the other end of the pedestal (11) is mounted a telescopic boom (15). The boom is pivotally mounted at one end on a pivot (16) for elevation about a horizontal axis. In the example, the boom (15) has one fixed (15a) and two extendable (15b & 15c) sections. At the end of the boom, remote from the pivot (16), is mounted a platform or work station (17), that is in the example illustrated in the form of a bucket.

The chassis, mobile on wheels (20), has a power source (21) at the rear end. The power source (21) includes a hydraulic pump for operation of the pedestal, boom, stabilizers and other features. For example, the pedestal can be rotated by a hydraulic motor, while the boom is lifted by hydraulic rams (23) and sections of the boom are extended also by hydraulic rams (24). Further hydraulic rams (30) are used to maintain the work platform at a constant level attitude while the suspension structure is rotated, raised and lowered into any spatial position. Outriggers (22) are employed to provide an expanded support base and to pre-level the machine at each location where the support structure is to be deployed.

Figure 1:
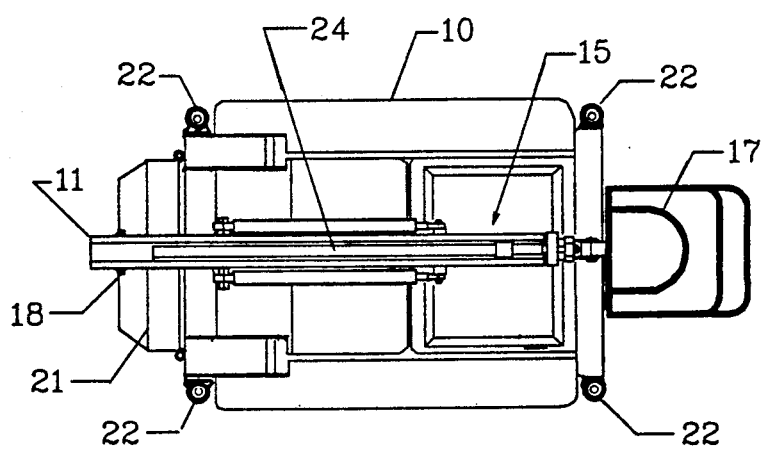
FIG. 1 is a top plan view of one form of vehicle embodying the invention.
Figure 2:
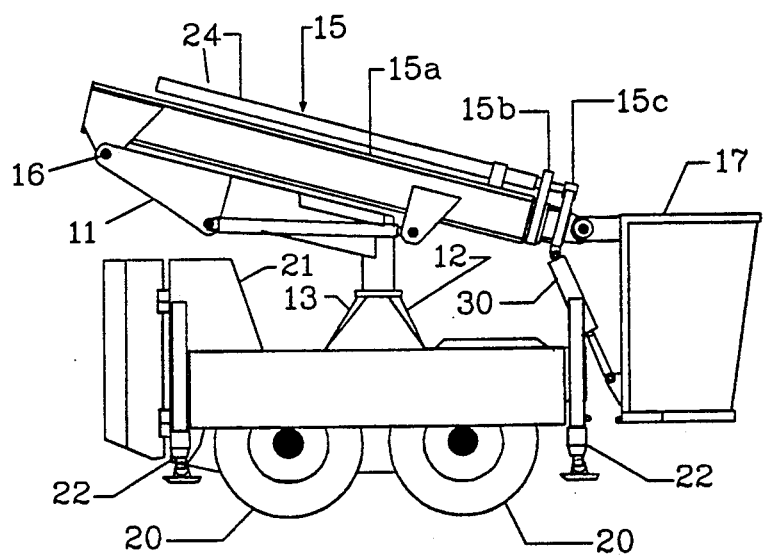
FIG. 2 is a side view of the vehicle as illustrated in FIG. 1.
Figure 3:
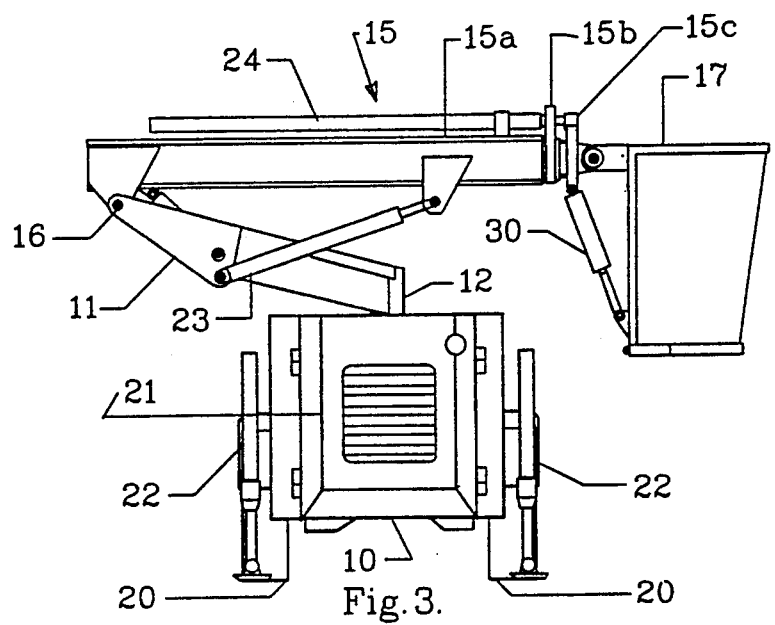
FIG. 3 is an end-view of the vehicle as in FIGS. 1 and 2, but with the boom extending transversely.

FIG. 2 illustrates the apparatus from the right side and with the work platform docked in the ground travelling configuration. FIG. 3 is a rear view that illustrates the pedestal (11) and boom (15) extending transversely, the pedestal (11) having pivoted on the pillar (13).

Figure 4:
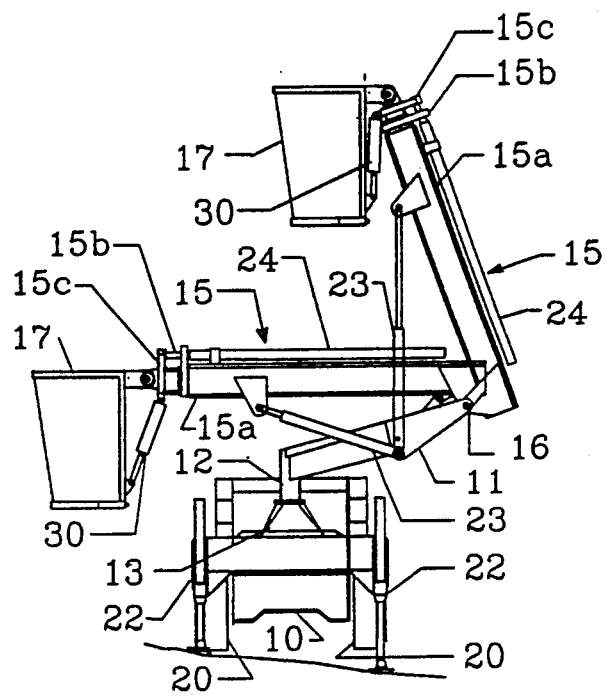
FIG. 4 illustrates the various platform positions at the side of the vehicle.
Figure 5:
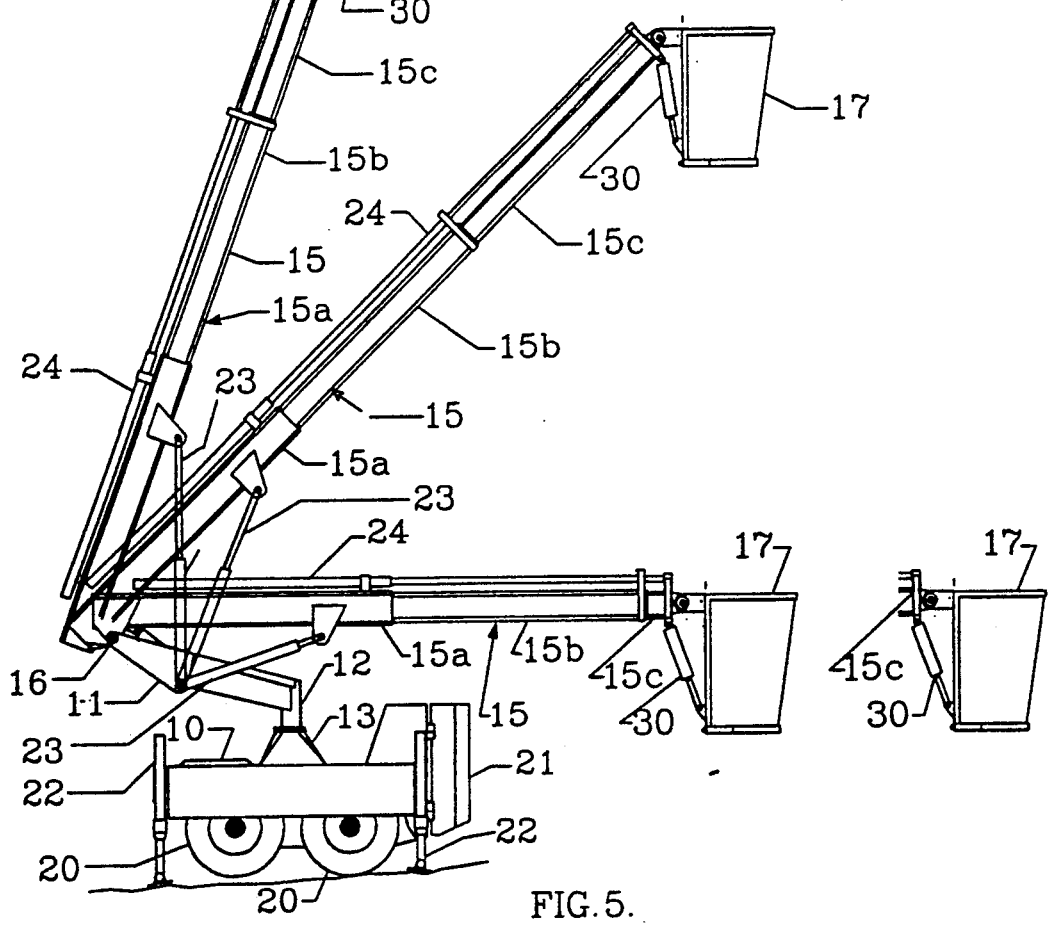
FIG. 5 illustrates various platform positions at the rear and above the vehicle.

FIGS. 4 and 5 illustrate the apparatus in use. In the front end view presented as FIG. 4, the pedestal and boom are positioned transversely, with the unextended boom being shown in two different positions: one at maximum elevation with the platform (17) above the chassis, the second with the boom at an intermediate position extending sideways at an intermediate height for the platform. In FIG. 5, the pedestal and boom extend along the fore and aft axes of the chassis, the boom in four different configurations: one showing the platform (17) positioned at maximum height; a second with the platform at intermediate height and forward position; and finally with the boom level and the platform extended to intermediate and full out positions.

It will be appreciated from inspection of FIGS. 1 thru 5 how this invention employs a rough-terrain capable carriage unit to transport and position the work platform and its mobile suspension structure throughout any extended worksite area, for instance an orchard. It will also be appreciated how this assembly is fitted with a powered outrigger system that can provide a level, stable suspension structure base of requisite dimensional size to accommodate pronounced slope and/or surface irregularities within such a worksite area. It will be further appreciated how a mechanically simple boom structure capable of being rotated 360 deg. or more about a vertical axis, elevated 90 deg. or more about a horizontal axis and telescopically extended and retracted linerially along the boom axis is employed to move a constantly leveled work platform along any unobstructed path and to any selected point within the hemispheric volume defined by the boom's maximum and minimum extension radii.

In order to realize the full task performance potential of the platform in applications such as tree crop harvesting, a man-linked control interface is incorporated into the work platform (17). This interface provides the necessary span of control actuating sensors needed to receive, translate and transmit machine response directives originated by a picker, or other operator, to all machine actuator elements that must be employed to meet each directive. The control interface is designed to monitor the natural task-related movements of the pickers body as the source of these directives. The means for accomplishing this man-machine linkage is illustrated in FIGS. 6A, 6B, 6C, & 6D.

Figure 6A:
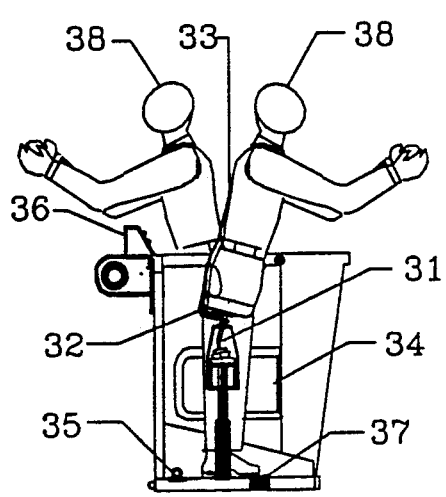
Figure 6B:
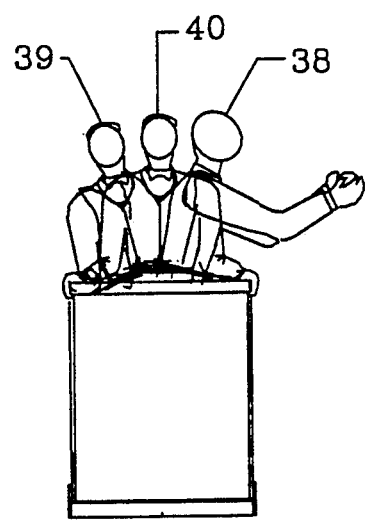

A means for detecting and resolving directives from the picker for movements and positioning of the work platform in the horizontal plane is illustrated in FIGS. 6A and 6B. The directing member (31) is attached to the picker's body trunk, by means of a seat (32) and/or vest (33), and moves in accordance with movements of the picker. Thus, the directing member can be moved in a forward (38) or backward motion, in a sideways motion (39) or in a combination of such motions, from an upright position (40), depending upon the picker's movements. Also, means for detecting a leg movement indicative of a desire for an upward or downward movement is provided. This is described later with respect to FIGS. 6C and 6D.

Operation is as follows: When the operator leans in any direction, his movement is detected by the directing member (31), which moves in unison. This member incorporates two inclinometer elements positioned at right angles to each other in the horizontal plane. One element is fixed in position to measure angular displacement in the vertical plane oriented along the support-arm work-platform axis; the second is positioned to measure angular displacement in the cross-axis vertical plane. The vest (33) and seat (32) linkage to the picker's body trunk is mounted on a ball-swivel vertical axle that permits the picker to lean in any direction. It is attached to this axle by a free turning bearing that permits him to continuously orient his body to face in any desired direction. Arranged in this manner the actuating member serves to continuously resolve picker body angular attitudes into two orthagonal components and to generate voltage outputs proportional to each angular component.

The output of the axially aligned inclinometer is then transferred through an onboard microprocessor to the electrohydraulic proportional output control valve, which extends and retracts the boom. Simultaneously, microprocessor generated signals are also sent to the control valve, which causes pivoting of the boom about pivot (16), so that the platform is maintained at the same height. Similarly, outputs of the cross-axially aligned inclinometer transmit a signal through the microcomputer to the control valve which controls the rotation of the pedestal on the pillar. The result of these processes is planar movement by the platform that is matched to picker direction of lean, and where the rate of such movement is proportional to the degree of such directive lean. The platform can thereby provide the same movement responses that the operator normally experiences when moving about on his own legs.

Figure 6C:
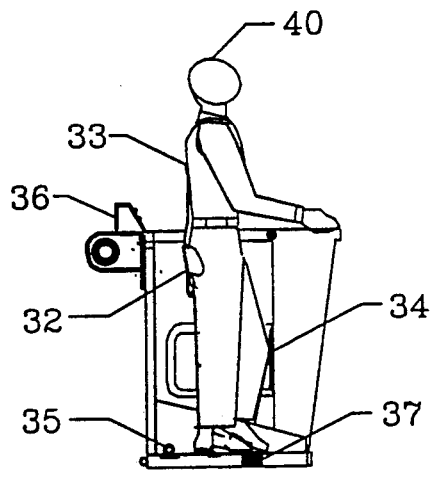
Figure 6D:
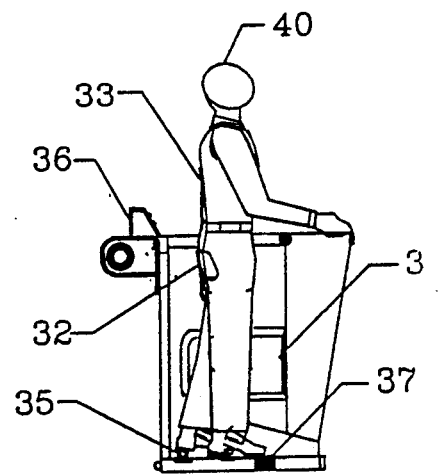

FIGS. 6C and 6D illustrate how analogous picker body movements are employed to signal and control vertical movements of the work platform. The directive signal for upward movement by the platform is derived from knee pressure by the picker against a sensor pad

(34) attached to the wall of the inner bucket. This pad can be configured to provide output voltage signals proportional to the pressure exerted by the picker, or only on/off output as appropriate. Downward movement directives are produced by pressure of the picker's foot on a linear or circumferential sensor (35) mounted on the floor of the platform. Here again this sensor can be configured to provide proportional or on/off outputs. A "master control" or "dead man's" switch (37) which must be activated before any movement by the support structure can occur, is provided.

As is the case for the horizontal movement output directive signals, the signals delivered by the up and down sensors are transmitted through the microprocessor to the control valve which causes pivoting of the boom about pivot (16). Again the microprocessor is used to simultaneously output control signals to the control valve that produces boom extension movement (15) to provide rectilinear up and down movement by the work platform. By combining up or down directives with simultaneous planar motion lean directives coordinated tridimensional movement and positional control are readily and naturally achieved.

Conveniently, the directing member detecting and indicating movements of the operator's body sends signals to a microprocessor, which in turn sends signals to the various valves. The microprocessor can be used to control all or nearly all functions of the apparatus. For example, when the chassis itself is to be moved or repositioned, the operator can activate a mode switch which will allow his body movements to control movement of the chassis. A forward movement will cause the drive motors of the chassis to move the entire apparatus forward. An angular movement will cause the chassis to turn and move in the direction of the lean.

The microprocessor can have a self-programming mode that will allow it to record and retain a record of movements made by the various components. The operator can recall and activate this program and cause the apparatus to repeat actions. Such programs can be combined with other programs.

The microprocessor can continuously monitor the position of the various components of the boom in relation to fixed datum points and thus knows where the platform is. In fruit picking, the operator may fill a fruit storage container at the platform and wish to empty it into a field bin, which can be carried on the rear of the chassis. The operator can execute a "go-to-bin" mode switch (36) directive, and the platform will be moved to a position over the bin for release of the picked fruit. By executing a "return-to-station" mode switch (36) directive, the platform will be returned to its previous position, whose position coordinates it recorded upon the initiation of the preceding "go-to-bin" mode directive.

Mode directive switches (36) can also be used to move the platform to a travel position, raise the outriggers and then switch the control mode to "travel". After repositioning the apparatus, the directive "activate arm" will cause displacement of the outriggers, bring the chassis to a level position and then release the platform from the travel position where it is kept immobile during travel.

Prior to permitting deployment of the work platform from the travel position the apparatus executes a self-levelling process. A suitable detector, for example a mercury switch, is used to locate the lowest corner or side. The appropriate outrigger or outriggers are then deployed to bring the chassis up to just past level. Then the remaining outriggers are deployed to level the chassis.

Mercury switches can also be used to monitor tilt when the outriggers are up and the chassis is in the travel mode. Any tilt beyond a pre-determined angle can result in a warning signal or stopping of movement and other actions.

The invention, particularly as described above and illustrated in FIGS. 1 to 5, is applicable to other forms of apparatus. For example, the invention can be applied to apparatus having a scissor- or trellis-type boom.

The invention is readily applicable to apparatus for other uses than fruit picking. As an example, the invention is applicable to apparatus for pruning and otherwise treating date palms and to harvesting of date palms. Date palms are pruned early in the growing cycle then fertilized by pollination, then covered from moisture and finally harvested. One or more of these operations, for example pruning and pollination, can be carried out by some form of apparatus mounted at the work station. A cutter can be mounted for pruning. Operation of the apparatus can then be from a position on the ground, the operator moving a directing member in the desired direction to obtain corresponding movement of the work station and the cuter. The cutter would also be actuated from the ground. Covering and harvesting would normally be carried out by someone positioned at the work station, their movements moving the actuating member, as in the fruit picking apparatus.

It will be appreciated that the invention can be incorporated in various forms of apparatus for various uses. Thus, vehicles used in construction are an example; and another is deicing apparatus for aircraft. The invention leaves both hands of the operator free for whatever operation is being carried out; the operator controls the movement of the apparatus by body movements.

It is also seen that the control system can be applied in many other ways in which a task related action or motion is required.

FIG. 7 illustrates diagrammatically a form or arrangement of a directing member (31). The directing member is pivotally and rotationally mounted in a support member (41). Movement of the directing member in any direction by tilting, as indicated by arrows (42) (43) (44) (45) and (46), results in the angular displacement of one or the other, or both, of the proportional voltage divider inclinometers (47a) and (47b) mounted on members (31) and (41). The inclinometers (47a) and (47b) resolve the tilt of the directing member into two orthagonal angular components and produce voltage signals (48a) and (48b) which the operator interface (51) (FIG. 8) transmits to the control system microprocessor (50) (FIG. 8). Outputs from the "up" signal pressure-pad (34), "down" signal pressure-bar (35), "mode" signal select switches (36) and "go" signal power-on switches (37) are fed into the system microcomputer (50) through the operator interface (51) in an analogous manner. This microprocessor (50) in turn translates these voltage inputs into situationally appropriate actuator commands, generating direction and rate of movement by the work platform: Thus, the direction and degree of the pickers body trunk tilt and leg actions is resolved and translated into direction of platform movement.

Provision can be readily made for altering the means for directing system operation, for instance to accommodate a change in the positioning of the operator. Thus, with an operator positioned on the work station, the direction of movement of the work station is directly related to the direction of movement of the operator's body. Similarly, if the operator is positioned on the ground with a hand-operated director member and faces in the same direction as the work station, then again, the applied movements and the resulting work station movements are directly related.

However, when such a remote hand-held director member is used, it can occur that it would be more convenient for the operator to be facing in a different direction. For example, the operator could be in front of the machine facing toward it. In such an instance, the work station movements in the horizontal plane would be the reverse of movements normally applied to the directing member. A simple means for adjusting the operation response to continue to match operator movements is to provide a selector switch in the actuation member, the mode being altered by tilting the actuation member, which conveniently, has a hand-grippable portion for ease of use.

Vertical movements can be obtained by providing a further input. For example, a foot-actuated member could be used or a suitable member provided on the actuation member.

Switches can be provided on the actuating member for initiating mode changes—for example, for programming, for traversing the vehicle and other reasons. A "dead man's" switch can be positioned on the top of member (33), or a separate switch can be provided, as when the moveable member is connected to a seat or other item.

FIG. 8 illustrates diagrammatically a representative control system arrangement incorporating a microprocessor (50) capable of being programed to continuously adapt machine control responses to operator task performance directives in accordance with situational variables and operational constraints. The dynamic inputs to the microprocessor (50) typically derive from three principal sources; these are the operator interface (51), the equipment status interfaces (52) and any task effector interface (53) that may be installed. The processing and operational logic programing that is to be applied to translating these inputs into system control outputs is entered into the microprocessor (50) by means of a programmer and process monitor (54) interface. On-board the microprocessor (50) this programing will typically be stored in non-volatile memory units and will auto-run continuously whenever the microprocessor is turned on. The programmer and process monitor capability may be in the form of an integral part of the microprocessor (50), a portable plug-in module, or a remote communication-link connected system.

As is diagrammatically illustrated in FIG. 8 the principal control outputs from the microprocessor (50) are electrical signals directed to the individual machine actuators used to power movements of the mobile base and the suspension structure. In the tree crop machine these include digital pulse train outputs to electrical stepping motor actuators (55), infinitely variable voltage/current outputs to proportionally controlled electrohydraulic valve actuators (56) and on/off electrical outputs to relay controlled actuators (57). A second category, that of information outputs, can be generated both intermittently and continuously by the microcomputer and delivered as appropriate to the user. Current operating status information including system readiness, mode, current configuration and limit warnings are delivered to the picker through the operator interface (51). This information can be conveniently generated and delivered in a full range of formats including; visual status indicator and/or data display, audio signal and/or voice message, and direct intervention including stop action or corrective response. Task specific programing is used to generate an additional body of informational outputs that can be called up as required through the programmer and process monitor (54). These include such collateral functions as fault diagnosis, maintenance status and discrete element performance testing.

The microprocessor is programmed to monitor the appropriate task performance related directive signals received from the operator's torso, hand and/or leg movements and to respond with coordinated proportional control signals to the apparatus' servo-valves that must be activated to satisfy the operator's control directive. Thus, if the operator leans his torso forward to the extent that he signals for full rate forward movement and at the same time leans his torso slightly to the left, the microprocessor will interpret the directives and send simultaneous control signals to the valves that will cause the work station to move in accordance with the operator's desires. In this particular example these would include the valve that controls boom extension, the valve that controls boom elevation ( to keep the work station on a level plane) and the valve that controls boom rotation. If at the same time, however, the operator were to signal a desire for an upward or downward movement of the work platform, the microprocessor would have received that directive signal, processed it in combination with the other directives, and sent the appropriate control signal to the boom elevation valve to accomplish simultaneously with the other movements the desired height adjustment.

The microprocessor can be provided with any requisite number of preprogrammed operating modes and/or task specific action sequences needed to selectively and immediately adapt its control responses to optimize man-augmentation performance across a full span of tasking requirements. Typically, as applied to the tree harvesting machine system, these selectable modes will include both rectilinear-coordinate platform movement responses and polar-coordinate platform movement responses to operator directive inputs. They will also include switch-selectable automation modes capable of moving the work platform from any "work" point in its operating envelope to a "dump" position above a towed trailer and then returning to the "work" point or, alternatively, proceeding to a "docking" station (FIG. 2.) for surface movements by the moveable base.

The microprocessor can have a self-programming mode that will allow it to record and retain a record of a sequence of operator directed movements being made by the various components of the apparatus. The operator will then be able to recall and activate this program and cause the machine to repeat the actions of the machine recorded during the programming phase. Such programs can be combined with other programs and executed as part of a task specific sequence of movements.

The microprocessor is continually monitoring the positions of the various components of the boom in relation to a fixed coordinate system. As a result, it always "knows" where the work station is in relation to other parts of the apparatus. In a fruit-tree picking operation, the operator may fill the fruit storage container on the work platform and wish to empty it into a field bulk-handling bin, which is carried either on a fork-liftlike attachment or bin trailer at the rear of the chassis. Because of the microprocessor's relational knowledge, the operator can execute a go to "dump" mode command, and the work station will automatically move to a position over the field bin into which the operator can release the fruit stored in the work station. Upon completion, the operator can execute a return to "work" point mode command, and the work station will automatically return to its position immediately before the "dump" command was executed.

A similar mode command will be used to move the work station to a pre-designated travel station, raise the self-levelling outriggers and then switch the control mode to "travel". The operator can then activate the propulsion system of the chassis and reposition the apparatus. When repositioned, the operator can execute the "activate arm" mode, and the outriggers will deploy and bring the chassis to a level position and then release the work station from the travel mode where it has been kept immobile during the travel phase.

The pedestal boom combination is mounted on a moveable chassis. The microprocessor is designed to provide signals to all activating valves and motors on the apparatus. When the chassis itself is to be moved or repositioned, the operator activates a mode control switch which allows his torso, arm and/or leg movements to control the ground movement of the entire chassis. The operator, by leaning forward when the machine is in the "travel" mode, will send a signal to the microprocessor that in turn will activate the drive motors of the chassis mechanism and cause the entire apparatus to move forward. Body rotation movements to the left or right will cause the chassis to curve its path in the direction of the rotation, with the turn radius proportional to the angle of rotation. For instance, a full 90-degree rotation of the operator's body trunk without any forward bending of the torso will cause the chassis to execute the most radical left or right turn, depending upon the direction of the lean, permitted by the chassis design.

The microprocessor can also serve a number of other functions. Some of these can relate to maximizing operational safety. The microprocessor can log major component operating hours, record maintenance work done and provide system diagnostics to pinpoint maintenance malfunctions.

The apparatus can have an option that will switch the control from the work station to a hand-held control device that can be used to control the apparatus from a remote location away from the machine. Such a control system an communicate with the microprocessor by various means—including pneumatic, electrical, optical fiber, and infra-red or radio frequency radiation.

The apparatus can have a self-levelling system. It can employ a two-axis gravity sensor such as a mercury switch array to locate the lowest corner or side of the apparatus. Upon the operator's signal it then deploys outriggers at the lowest corner or side of the apparatus to lift the apparatus to the sensors level position. It then deploys the remaining outriggers to lock the entire chassis in the level position. When the chassis is level and all the outriggers have been deployed, the system sends a signal to the microprocessor which activates the work station controls that operate the boom. If a level position is not reached, the boom controls will not be activated.

Gravity sensors in conjunction with the microcomputer can also be used to dynamically monitor the degree of tilt when the outriggers are up and the apparatus is in the travel mode. If the angle of incline measured by the sensors reach a pre-programmed point the microprocessor can act on this signal in any number of ways; it can sound and/or flash a signal, suspend further movement by the chassis drive motors and lock the brakes or cause other similar actions or combination of actions to take place.

The microprocessor can also be programmed to go through a series of diagnostic tests when the apparatus is started after it has been idle for a designated period of time. After the microprocessor has run its own built-in test (BIT), it performs diagnostic tests on all the safety systems that it controls as well as operating system tests. The microprocessor can be programmed respond to any system malfunctions in a number of different ways, from making a maintenance note for delivery upon periodic interrogation, signaling the operator, intervening to deny deployment of the suspension boom, or to the act of shutting down the entire apparatus.

The apparatus can be equipped with a boom attachment which will allow the apparatus to lift, carry, lower and place field bins. The empty bins are routinely distributed down rows, between trees that are to be harvested, in a volume that approximates need. By means of the boom attachment the apparatus is able to pick up an empty bin from in front of the unit and place it on a carrier rack or trailer attached to the rear end of the machine. The unit then proceeds down the tree row with the picker periodically dumping the harvested fruit into the handling bin. When a bin is full, the boom attachment is employed to lift and place the full bin between the harvested tree rows to the rear of the apparatus. The apparatus next reverse its boom position, picks up an empty bin, then places it on the attached carrier. The apparatus is sized and configured in a manner that will permit it to rapidly an efficiently accomplish this and related harvesting maneuvering in the small space between orchard trees.

The apparatus, using the microprocessor or some other unit, has various safety features. Thus, it can be provided that there are brakes which must be powered off. In the event of a power failure or hydraulic malfunction, the brakes go and stay on until they can be powered off.

The unit has four outriggers, one mounted on each of the four corners of the machine. These outriggers automatically level the machine before the workstation can be released from the travel position. If the machine is on a slope too steep to allow the outriggers to achieve a level position when fully extended, the work station will not be released from the travel position. Keeping the machine in a level position while working the arm not only saves wear and tear on the machine by reducing stress on many parts, but also eliminates a major cause of upset.

In the hydraulics system, the various valves can be provided with by-pass features which will become operative whenever load or resistances are encountered which exceed design specifications. All the hydraulic rams have lock-up valves. If the engine dies or hydraulic pressure is lost, the rams lock up and maintain position until pressure is restored. Some manual override can be provided to bring a work station slowly down to ground level, if desired.

The microprocessor or computer on board adds significant opportunities to improve safety. As a diagnostic tool, it can be used to detect malfunctions in the operating systems that can affect safety. For instance, the machine will be equipped with a proximity-sensor that will prevent the arm or the machine itself from coming within a specified distance of an electric high-tension line. The computer can be used to monitor this system. If not in proper working order, the computer, depending upon the machine's configuration, will either record a maintenance advice, sound a warning or stop the arm operation.

The microprocessor can also be used to monitor operations of the machine with a built-in test (BIT) that runs whenever the computer is turned on. As indicated above, the computer will monitor the deployment of the outriggers and will allow the arm to be released unless the machine is in a level position. It will also monitor the travel operations and sound a warning whenever the machine approaches a pre-programmed degree of tilt. This and other monitoring systems should help prevent operator-induced problems.

Another role that the computer can play is in the monitoring of the maintenance of the machine. It can provide a log of the operating hours on the various systems and advise maintenance personnel of maintenance work that needs to be done. As a result, a complete maintenance record of each machine can be maintained by the machine itself. Well-maintained machines contribute to safety a well as performance.

The control system also contributes to safety. The controls respond to the movements of the operator's body. If the operator leans the torso forward, the work station will move forward. A "dead man" switch can be provided which must be 0 activated before work station movement can occur. Since a person's natural reaction is to move away from danger or threat of danger, the natural reaction will activate the machine in a direction away from threat. No time is lost in translating what lever or switch is to be activated to retreat from a threat; the machine instantaneously "knows" in what direction the operator wants to move and responds accordingly.

The control system also reduces the incidence of operator error caused by selecting the wrong control lever or button or giving the wrong signal to an activating lever or button. This is particularly important with new or untrained operators.

The various movements are controlled through a computer, which can have safe operating envelopes preprogrammed in. Certain safety factors can also be programmed, such a limiting tilt, speed of movement, etc. Certain repetitive movement programs can be provided. By providing a certain facility, it is possible to change the operation from one in which the operator is within the operating area to one in which the operator is outside the operating area. Various other modifications and variations in operation can be provided.

What is claimed is:

1. An adaptive control man-augmentation system for controllably moving a suspended work station comprising:
   a support structure including at least one moveable member supporting a work station;
   means for moving said at least one moveable member to move said work station in horizontal and vertical directions;
   means for continuously monitoring the position of said work station relative to a predetermined support structure coordinate;
   a directing member including means for connection of said directing member to an operator's body part for movement therewith;
   control means for determining movement of said directing member by said operator and resolving said movement relative to two axes normal to each other and in a substantially horizontal plane and having a substantially fixed relationship to said support structure, said control means including;
   means for producing control signals related to the direction of said movement relative to said axes and related to the displacement of said directing member, to move said work station in the direction of said movement at a speed relative to said displacement, and maintaining said work station at a predetermined vertical position; and
   micro-processor means adapted to receive signals produced by said operator's body part positioning and to generate said control signals, said micro-processor being programmable so as to transpose said operator's body reflex generated movements into precise work station movements.

2. The system of claim 1, including programmed means for continuously adapting positioned directive signals in accordance with situational variables, to produce the same movement response rates for each operator body part movement at all locations within an operational volume of the system.

3. The system of claim 1, including programmed means for restricting movement of said work station to prevent said work station, and any elements of said support structure, from entering space allocated for use of other system elements.

4. The system of claim 1, including sensing means and programmed means for continuously monitoring loading and other movements, to restrict work station positioning to safe operating limits.

5. The system of claim 1, including programmed means for conditioning the movement response rates of the work station to desired values.

6. The system of claim 1, including programmed means to permit operator signals to said micro-processor to memorize a sequence of work station movements, whereby, on demand said microprocessor actuates said support structure to move said work station in said sequence, in forward or reverse order, said activation pausing at any position and resuming as desired.

7. An adaptive control man-augmentation system for controllably moving a suspended work station, comprising:
   a support structure including at least one moveable member supporting a work station, said work station including a bucket;
   means for moving said at least one moveable member to move said bucket in horizontal and vertical directions;
   means for continuously monitoring the position of said bucket relative to a predetermined support structure coordinate;
   a directing member mounted in said bucket and including means for connection of said directing member to an operator's upper torso for movement therewith, in accordance with pivotal and axial alignment of said operator's upper torso;
   control means for determining movement of said directing member by said operator and resolving said movement relative to two axes normal to each other and in a substantially horizontal plane and having a substantially fixed relationship to said support structure;

said control means including means for producing control signals related to the direction of said movement relative to said axes and related to the displacement of said directing member, to move said bucket in the direction off said movement at a speed relative to said displacement, and maintaining said bucket at a predetermined vertical position; and means in said bucket adapted to determinative positioning of a lower leg of said operator for producing vertical movement of said bucket.

8. The system as claimed in claim 7, including:
a chassis including means supporting said chassis for movement over a surface;
outriggers on said chassis for levelling and lifting said chassis;
said support structure including a pivotal member mounted on said chassis and an extendable and retractable boom on said pivotal member for movement about a substantially vertical and horizontal axes.

9. The system of claim 8, including means for extending and retracting said outriggers and means for producing signals indicative of the leveling of said chassis and sending said signals to said microprocessor.

10. The system of claim 9, including a docking position for said work station and a means for detecting said work station at said docking position.

11. The system of claim 10, including means for locking said work station at said docking position until extension of said outriggers and levelling of said chassis.

12. The system of claim 7 in which said control means includes a micro-processor adapted to receive signals produced by an operator's torso movements and generate said control signals, said microprocessor being programmed to transpose said operator's body reflex generated movements into precise bucket movements.

13. The system of claim 12, including programmed means for continuously adapting positioned directive signals in accordance with situational variables, to produce the same movement response rates for each operator torso movement at all locations within an operational volume of the system.

14. The system of claim 12, including programmed means for restricting movement of said work station to prevent said work station, and any related elements of said support structure, from entering space allocated for use of other system elements.

15. The system of claim 12, including sensing means and programmed means for continuously monitoring loading and other movements to restrict bucket positioning to safe operating limits.

16. The system of claim 12, including programmed means for conditioning the movement response rates of the bucket to desired values.

17. The system of claim 12, including programmed means to permit operator signals to said micro-processor to memorize a sequence of bucket movements, whereby, on demand, said microprocessor actuates said support structure to move said bucket in said sequence, in forward or reverse order, said actuation pausing at any position and resuming as desired.

* * * * *